(12) United States Patent
Schnoebelen et al.

(10) Patent No.: US 7,975,265 B2
(45) Date of Patent: Jul. 5, 2011

(54) SYSTEM AND METHOD FOR PROVIDING INSTALLATION SUPPORT TO A USER

(75) Inventors: Jeffrey B. Schnoebelen, San Antonio, TX (US); Philip Ted Kortum, Austin, TX (US); Adam Lee Klein, Cedar Park, TX (US); Marcel M. Soens, Austin, TX (US); Jamie Andrew Fisher, Austin, TX (US); Wesley M. McAfee, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 983 days.

(21) Appl. No.: 10/887,211

(22) Filed: Jul. 8, 2004

(65) Prior Publication Data

US 2006/0010345 A1 Jan. 12, 2006

(51) Int. Cl.
*G06F 9/445* (2006.01)
*G06F 11/00* (2006.01)
*G06F 9/44* (2006.01)

(52) U.S. Cl. ............. 717/174; 714/2; 714/38; 714/48; 719/327

(58) Field of Classification Search .............. 717/174, 717/176
See application file for complete search history.

(56) References Cited

U.S. PATENT DOCUMENTS

| | | | | |
|---|---|---|---|---|
| 5,491,791 A | * | 2/1996 | Glowny et al. | 714/37 |
| 5,761,308 A | * | 6/1998 | Torii et al. | 705/52 |
| 5,995,757 A | * | 11/1999 | Amberg et al. | 717/175 |
| 6,006,035 A | * | 12/1999 | Nabahi | 717/175 |
| 6,029,258 A | * | 2/2000 | Ahmad | 714/46 |
| 6,170,065 B1 | * | 1/2001 | Kobata et al. | 714/7 |
| 6,279,156 B1 | * | 8/2001 | Amberg et al. | 717/124 |
| 6,321,348 B1 | * | 11/2001 | Kobata | 714/37 |
| 6,327,706 B1 | * | 12/2001 | Amberg et al. | 717/174 |
| 6,363,499 B1 | * | 3/2002 | Delo et al. | 714/15 |
| 6,477,531 B1 | * | 11/2002 | Sullivan et al. | 1/1 |
| 6,543,047 B1 | * | 4/2003 | Vrhel et al. | 717/121 |
| 6,601,236 B1 | * | 7/2003 | Curtis | 717/177 |
| 6,684,242 B1 | * | 1/2004 | Bahlmann | 709/222 |
| 6,698,018 B1 | * | 2/2004 | Zimniewicz et al. | 717/175 |
| 6,738,970 B1 | * | 5/2004 | Kruger et al. | 717/175 |
| 6,757,837 B1 | * | 6/2004 | Platt et al. | 714/4 |
| 6,883,118 B2 | * | 4/2005 | Morgan et al. | 714/43 |
| 6,928,644 B1 | * | 8/2005 | Kroening et al. | 717/175 |
| 6,944,858 B2 | * | 9/2005 | Luu | 717/174 |
| 7,096,488 B1 | * | 8/2006 | Zhang et al. | 725/105 |

(Continued)

OTHER PUBLICATIONS

Haynes et al., "Microsoft Computer Dictionary", 2002, Microsoft Corporation, total pages: 3.*

(Continued)

*Primary Examiner* — Michael J Yigdall
*Assistant Examiner* — Marina Lee
(74) *Attorney, Agent, or Firm* — Toler Law Group

(57) ABSTRACT

A system and method are disclosed for providing installation support to a user of a computer system. A method incorporating teachings of the present disclosure may include launching an installation tool in connection with installation of a peripheral driver. The tool may have capabilities that include, for example, capturing an install status at a plurality of predefined points in an install routine. During installation, an error may be detected at one of the predefined points and a diagnostic routine may be launched in response. The method may also include considering an accounting of the captured install states and using this information to help generate an action script crafted to resolve the detected install error.

20 Claims, 4 Drawing Sheets

U.S. PATENT DOCUMENTS

| | | | |
|---|---|---|---|
| 7,134,049 B2 * | 11/2006 | Gillenwater et al. | 714/25 |
| 7,257,741 B1 * | 8/2007 | Palenik et al. | 714/43 |
| 7,278,023 B1 * | 10/2007 | Siegel et al. | 713/183 |
| 7,283,993 B2 * | 10/2007 | McArdle | 707/3 |
| 7,602,898 B2 * | 10/2009 | Klein et al. | 379/265.01 |
| 7,634,077 B2 * | 12/2009 | Owhadi et al. | 379/265.02 |
| 2002/0004935 A1 * | 1/2002 | Huotari et al. | 717/11 |
| 2002/0144187 A1 * | 10/2002 | Morgan et al. | 714/43 |
| 2003/0046675 A1 * | 3/2003 | Cheng et al. | 717/173 |
| 2003/0046676 A1 * | 3/2003 | Cheng et al. | 717/173 |
| 2003/0051235 A1 * | 3/2003 | Simpson | 717/174 |
| 2003/0110241 A1 * | 6/2003 | Cheng et al. | 709/221 |
| 2003/0159138 A1 * | 8/2003 | Curtis | 717/175 |
| 2003/0200541 A1 * | 10/2003 | Cheng et al. | 717/169 |
| 2003/0226138 A1 * | 12/2003 | Luu | 717/175 |
| 2003/0237083 A1 * | 12/2003 | Hasegawa et al. | 717/176 |
| 2004/0078708 A1 * | 4/2004 | Li et al. | 714/43 |
| 2004/0078783 A1 * | 4/2004 | Matsushima | 717/126 |
| 2004/0107415 A1 * | 6/2004 | Melamed et al. | 717/124 |
| 2004/0168164 A1 * | 8/2004 | Shevchenko | 717/168 |
| 2004/0187105 A1 * | 9/2004 | Inada | 717/174 |
| 2004/0243994 A1 * | 12/2004 | Nasu | 717/171 |
| 2004/0255276 A1 * | 12/2004 | Rovang | 717/124 |
| 2005/0081111 A1 * | 4/2005 | Morgan et al. | 714/38 |
| 2005/0125788 A1 * | 6/2005 | Lupini et al. | 717/174 |
| 2005/0188369 A1 * | 8/2005 | Evers | 717/174 |
| 2005/0216269 A1 * | 9/2005 | Scahill et al. | 704/270.1 |
| 2005/0256858 A1 * | 11/2005 | McArdle | 707/4 |
| 2006/0010345 A1 * | 1/2006 | Schnoebelen et al. | 714/25 |
| 2006/0039547 A1 * | 2/2006 | Klein et al. | 379/265.02 |
| 2006/0282704 A1 * | 12/2006 | Morgan et al. | 714/26 |
| 2008/0028392 A1 * | 1/2008 | Chen et al. | 717/175 |

OTHER PUBLICATIONS

Meg G. Frantz, "The Evolution of the IT Help Desk to the Service Desk", Jan. 2006, retireved from <http://www.thinkhdi.com/library/deliverfile.aspx?filecontentid=437>, total pages: 10.*

* cited by examiner

SYSTEM AND METHOD FOR PROVIDING INSTALLATION SUPPORT TO A USER

FIELD OF THE DISCLOSURE

The present disclosure relates generally to computer systems, and more specifically to a system and method for providing installation support to a user of a computer system.

BACKGROUND

A network may be characterized by several factors, such as who can use the network, the type of traffic the network carries, the medium carrying the traffic, the typical nature of the network's connections, and the transmission technology that is used by the network. For example, one network may be public and carry circuit-switched voice traffic while another may be private and carry packet-switched data traffic. Whatever the make-up, most networks facilitate the communication of information between at least two nodes, and as such act as communication networks.

At a physical level, a given network may include a series of nodes interconnected by paths. To access different types of networks, users may need to link their computers to the network with a modem. The modem may represent a new piece of Customer Premises Equipment (CPE) hardware and may come with associated device driver or controller software. Unfortunately, users occasionally encounter problems when they attempt to install the new hardware and/or software components to existing computer systems.

There can be a number of reasons for these installation problems, and identifying and resolving the correct reason can require a great deal of trial and error, which may cause frustration on the part of the user. Moreover, the troubleshooting process may be unduly complicated and/or expensive, and the time to cure may be unacceptably long.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Embodiments discussed below focus on the installation of network connectivity hardware and associated software. A user new to a broadband data service like those provided with cable modems and Digital Subscriber Line (xDSL) modems may need to install software on their existing computer systems to allow their computers to "recognize" and communicate with and through the modem. Though the following discussions focus on this implementation of the teachings, the teachings may be applied in other circumstances as well.

Although certain embodiments are described using specific examples, it will be apparent to those skilled in the art that the invention is not limited to these few examples. Accordingly, the present invention is not intended to be limited to the specific form set forth herein, but on the contrary, it is intended to cover such alternatives, modifications, and equivalents, as can be reasonably included within the spirit and scope of the invention. In some embodiments, for example, the teachings disclosed herein may facilitate the troubleshooting of various installation difficulties—allowing service representatives and/or users to avoid some of the frustrations associated with browsing through operating system files and configuration settings in an effort to determine where or why an installation attempt failed.

From a high level, an installation support technique incorporating teachings of the present disclosure may include launching an installation tool in connection with installation of a peripheral driver. The tool may have capabilities that include, for example, capturing an install status at a plurality of predefined points in an install routine. During installation, an error may be detected at one of the predefined points and a diagnostic routine may be launched in response. The method may also include considering an accounting of the captured install states and using this information to help generate an action script crafted to resolve the detected install error. Depending upon implementation details, an action script may be a mini-program designed to fix a specific condition at least partially determinable through consideration of information collected at the pre-defined points of the installation attempt.

Figure 1:
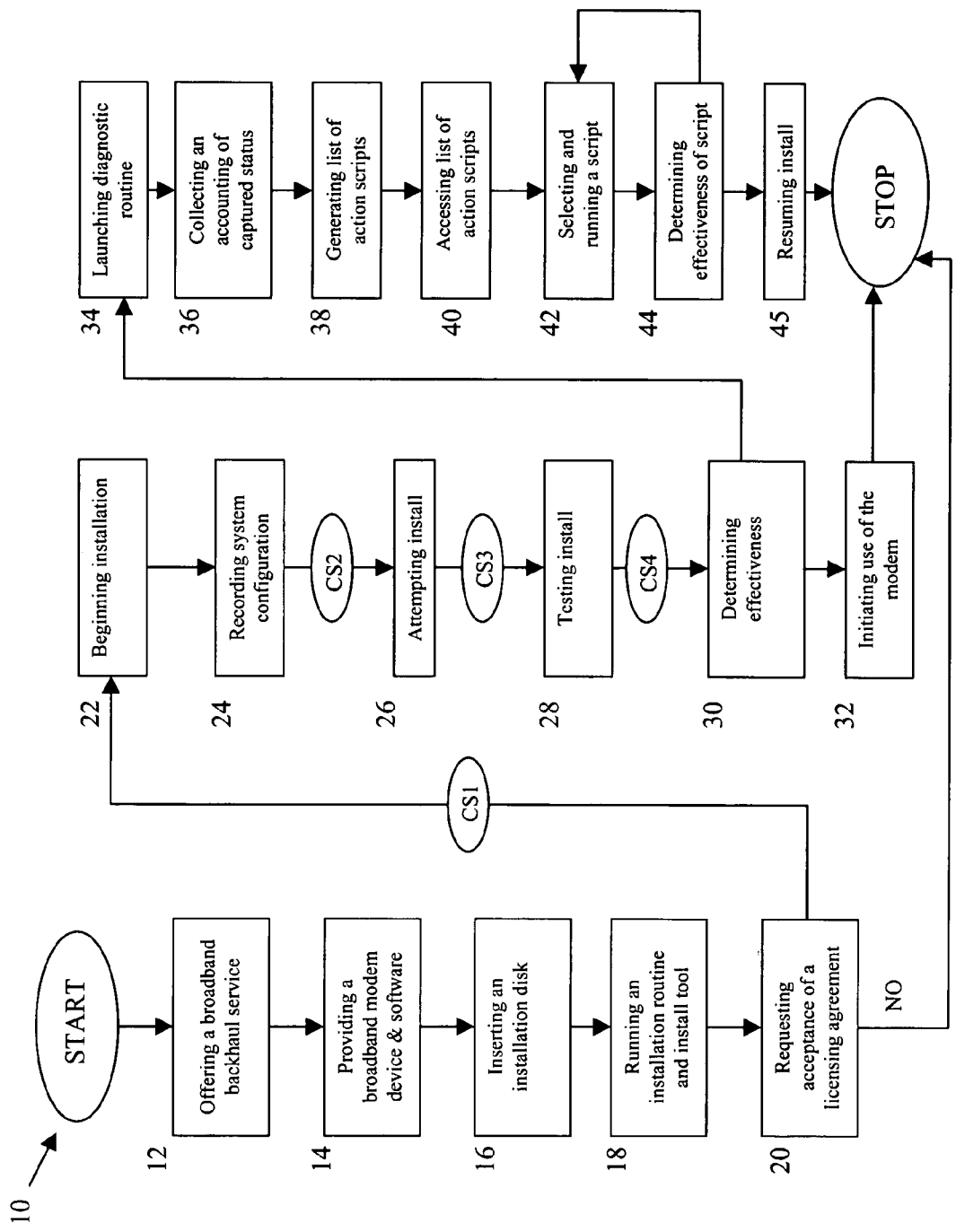
FIG. 1 presents a flow diagram for providing installation support to a user in accordance with the teachings of the present disclosure.

As mentioned above, FIG. 1 presents a flow diagram for a technique 10 that may be used to provide installation support to a user in accordance with the teachings of the present disclosure. At step 12, a new subscriber may contact a service provider in response to a broadband service offering. The service may be a wireline broadband option like Asynchronous Digital Subscriber Line (ADSL), some other form of Digital Subscriber Line technology (xDSL), and/or a cable modem-based offering. The service may also include a fiber-based offering like Fiber to the Home (FTTH) and Passive Optical Networking (PON) and/or a wireless option like fixed wireless, an 802.11x offering, and/or a satellite-based offering.

Whatever the underlying technology and backhaul, a user may request that an account be established. In response, a network operator or service provider may establish the account and define permissions for the user. The account and permissions may inform the network components of upcoming communications from the user and how to respond to those communications. At step 14, the subscriber may be provided with a modem device and associated software. In one embodiment, the modem device may be provided with an installation disk that holds computer-readable data representing the associated software, which may include device driver software, an installation support tool, a self-install program, a service configuration and customization program, a Point to Point Protocol (PPP) client, a Voice over Internet Protocol (VoIP) client, as well as other software modules.

In practice, the user may connect the modem device to a local computer system. In some embodiments, the computer system may recognize that a new hardware device has been connected to an interface of the computer system. The computer system may have checked for a locally stored driver and/or prompted the user to insert the installation disk. At step 16, the user may insert an installation disk into a drive of the computer system, and the computer system may begin reading instructions from the disk to facilitate establishment of the user's broadband service.

When active, the broadband service may allow the user's computer system to communicate with a network aggregation node via the modem. The aggregation node may be, for example, a digital subscriber line access multiplexer (DSLAM), some other telephone network node, a cable modem termination system (CMTS), some other piece of cable head end equipment, some other cable network node, and/or some other component capable of supporting communication with the modem device. Whatever its form, the aggregation node may "know" a modem device desires a connection when the modem device issues a request for connection.

In some embodiments, the connection process may be facilitated by a Point to Point Protocol over Ethernet (PPPoE) client executing at the computer system and/or the modem device. The PPPoE client may pass a UserID/Password combination to a network access server (NAS), which may utilize a security server, such as a RADIUS server, to authenticate the user and authorize the requested access. Allowing this process and other processes to operate in a manner transparent or nearly transparent to the user may rely, at least partially, on the successful completion of an installation routine.

As such, at step 18, the computer system may begin running an installation routine and installation support tool. The routine may include several steps. For example, a user may be prompted to accept an End User License Agreement (EULA) at step 20. If the user fails to properly accept the EULA, the install may fail and technique 10 may progress to stop. As depicted, if the user does not accept the EULA, technique 10 may fail to reach the check status 1 "CS1" point. If the user later calls a service representative or help desk seeking installation assistance, the representative may recognize that CS1 was not reached and determine that the user needs to begin the install routine again and accept the EULA.

If the EULA is accepted at step 20, technique 10 may progress through CS1, where a current status of the install routine may be captured, and onto step 22 to begin substantive installation. At step 24, the capabilities and configurations of the user's computer system and/or modem may be recorded. The recorded information may include, for example, operating system information, available memory information, processor information, communication port information, etc.

Technique 10 may then progress through CS2, where additional install status information may be recorded, and onto step 26 for software installation. At step 26, software may be loaded onto the user's computer system in an appropriate location and with appropriate call and/or triggering routines. Additional install status information may be recorded at CS3, and the install may be tested at step 28. Test results and/or other information may be recorded at CS4, and technique 10 may progress to step 30, where a determination may be made regarding the overall effectiveness of the install.

If the install appears to be successful, technique 10 may progress to step 32 where use of the modem may be initiated. At step 32, a connection may be established between the user's computer system and an aggregation node. The user may be directed to a service provider website that facilitates activities like user registration, establishing an email account, establishing an acceptable username and password combination, customizing a user homepage, etc. Technique 10 may then progress to stop.

If at step 30 or at some other point in technique 10 an error is detected, technique 10 may move to step 34 and a diagnostic routine may be launched. At step 36, one or more of the status reports recorded at CS1, CS2, CS3, CS4, and/or other points may be collected. At step 38, one or more action scripts may be generated to assist the user in overcoming the identified error or errors. The user and/or a service provider technician may access the generated action scripts at step 40 and select an action script for execution at step 42.

The selected action script may be launched, and at step 44, the effectiveness of the action script may be determined. If it appears the action script was unsuccessful, technique 10 may loop back to step 42, where another script may be selected. If it appears the action script was successful, the installation efforts may be resumed. In some embodiments, the installation effort may be resumed at the beginning of the installation routine. In other embodiments, the installation effort may be resumed at some other point. For example, technique 10 may involve looping back to resume the installation effort at a point near the point of error detection.

As depicted, technique 10 includes four check status points. In some embodiments, check status points may be added and/or deleted. For example, a check status point may be included after each major or minor step of a driver install and/or an account set-up routine. In some embodiments, a service provider may attempt to intelligently locate the check status points.

For example, a service provider may access a knowledge store maintaining a collection of past service records to identify where past users encountered install problems. If the service provider determines that problems are frequently encountered at a handful of install points, the service provider may design an installation tool to capture an install status at pre-defined points associated with the handful of install points.

Individual steps of process 10 may be amended, re-ordered, added, looped, and/or deleted without departing from the teachings. In addition, the party or device performing various steps may be altered as well, which may help to make effective use of available resources within a system implementing some or all of process 10.

Figure 2:
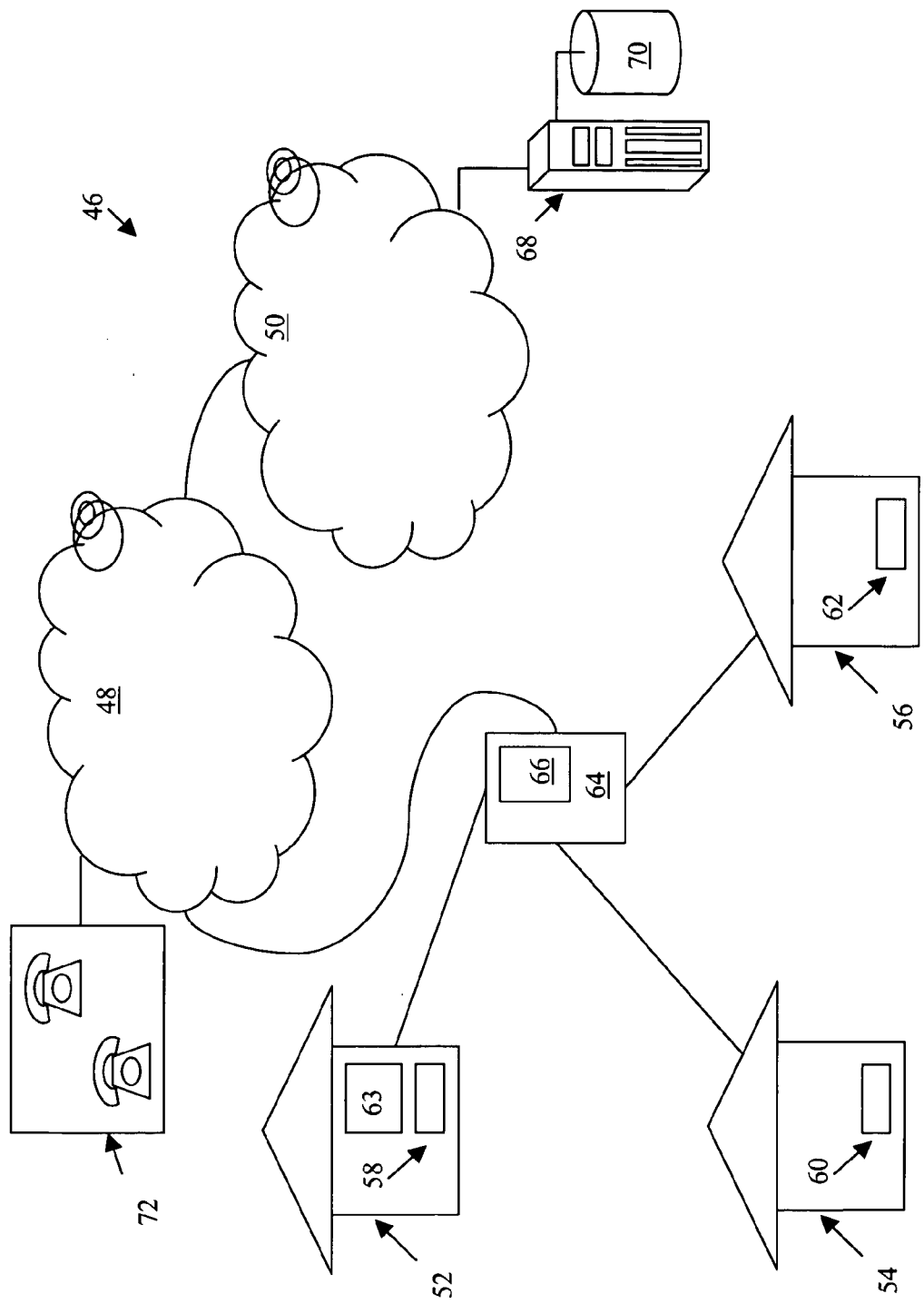
FIG. 2 shows one embodiment of a distributed system that incorporates teachings of the present disclosure to support a number of users attempting to install hardware and software on disparate computing systems.

As mentioned above, FIG. 2 shows one embodiment of a distributed system 46 that incorporates teachings of the present disclosure to support to a number of users attempting to install hardware and software on disparate computing systems. In operation, end users may seek access through a service provider network 48 to an information network 50, like the Public Internet, an Intranet, an Extranet, some other communication network, and/or some combination thereof. As shown, system 46 includes several premises 52, 54, and 56, each having its own broadband modem 58, 60, and 62, respectively.

In practice, a computer 63 in premises 52 may seek to establish a broadband backhaul via modem 58. The modem may be capable of communicatively coupling to service provider network 48. Network 48 may include, for example, a Public Switched Telephone Network (PSTN), a cable network, some xDSL infrastructure, a wireless network, and/or some other networking components capable of facilitating data communication. Whatever its make up, network 48 may be capable of communicating information. The communication could occur, for example, across dedicated circuits, as IP packets, and/or across an air interface.

As depicted, modem 58 may communicate with and/or through a facility 64 of network 48. Facility 64 may be, for example, a remote terminal (RT) site, a central office, a cable head end, or some other provider facility. As such, facility 64 may include network nodes like aggregation point 66, which may be a DSLAM or a CMTS for example. In operation, a user may connect to aggregation point 66 and seek access to an information services server like unified messaging server 68, which may have an associated repository 70 maintaining email, voice mail, facsimile, and other messages for the user living at premises 52.

When the user at premises 52 establishes a new service account and/or makes use of new connectivity hardware or software, the user may need to perform an installation process before accessing server 68. If the user encounters a problem during this installation process, the user may contact a call center 72 and request assistance. In an embodiment in which installation of modem 58 makes use of an installation tool incorporating teachings of the present disclosure, call center personnel may be able to isolate and identify the user's problem quickly.

For example, computer 63 may include a housing component at least partially defining an enclosure, and a processor may be secured within the enclosure. A memory and/or a drive may also be secured within the enclosure and may be holding instructions that represent an install engine. In practice, the install engine may execute on the processor and capture an install status at a plurality of predefined points during an install routine for a peripheral device driver, which may be a driver for modem 58. The install engine may also be capable of recognizing an error during the install routine and launching a script generator in response to detecting the error. In some embodiments, the script generator may consider the captured install status and generate a plurality of action scripts designed to resolve the error.

As mentioned above, FIG. 3 shows one embodiment of a system 74 that incorporates teachings of the present disclosure to assist a user during a hardware and/or software installation process. As shown, system 74 may include a computer 76 having a display device 78. When a user begins an install process, the user may insert an installation disk into a drive and launch an installation application, which may, among other things, cause the presentation of a command bar 80 and a document pane 82 on display 78.

As shown, document pane 82 includes a GUI element 84 informing the user of an install error and providing a list of potential cures for the error. The cures may include, for example, a collection of auto-generated action scripts. As depicted, the user may have tried the first script to no avail and may now want to try Action Script 2.

As mentioned above, a user of computer 76 may be attempting to install software associated a broadband access service and/or modem 87. The user may want, for example, to use modem 87 to connect to network 86. As shown, computer 76 includes a processor 90 and a memory 92. Similarly, modem 87 includes a housing component 88, a broadband modem module 94, and a processor 96. As shown, housing component 88 may at least partially define an enclosure housing broadband modem module 94 and a processor 96.

In practice, a user may be installing software on computer 76 for various reasons. The user may be installing a device driver to allow computer 76 to utilize modem module 94 to access a network aggregation point of network 86. The to-be-installed software may also include account set-up and/or configuration capabilities that facilitate the user's ability to enjoy a network-based data service like email, VoIP, or web browsing, which may be supported by a remote information service node like server 98.

Figure 3:
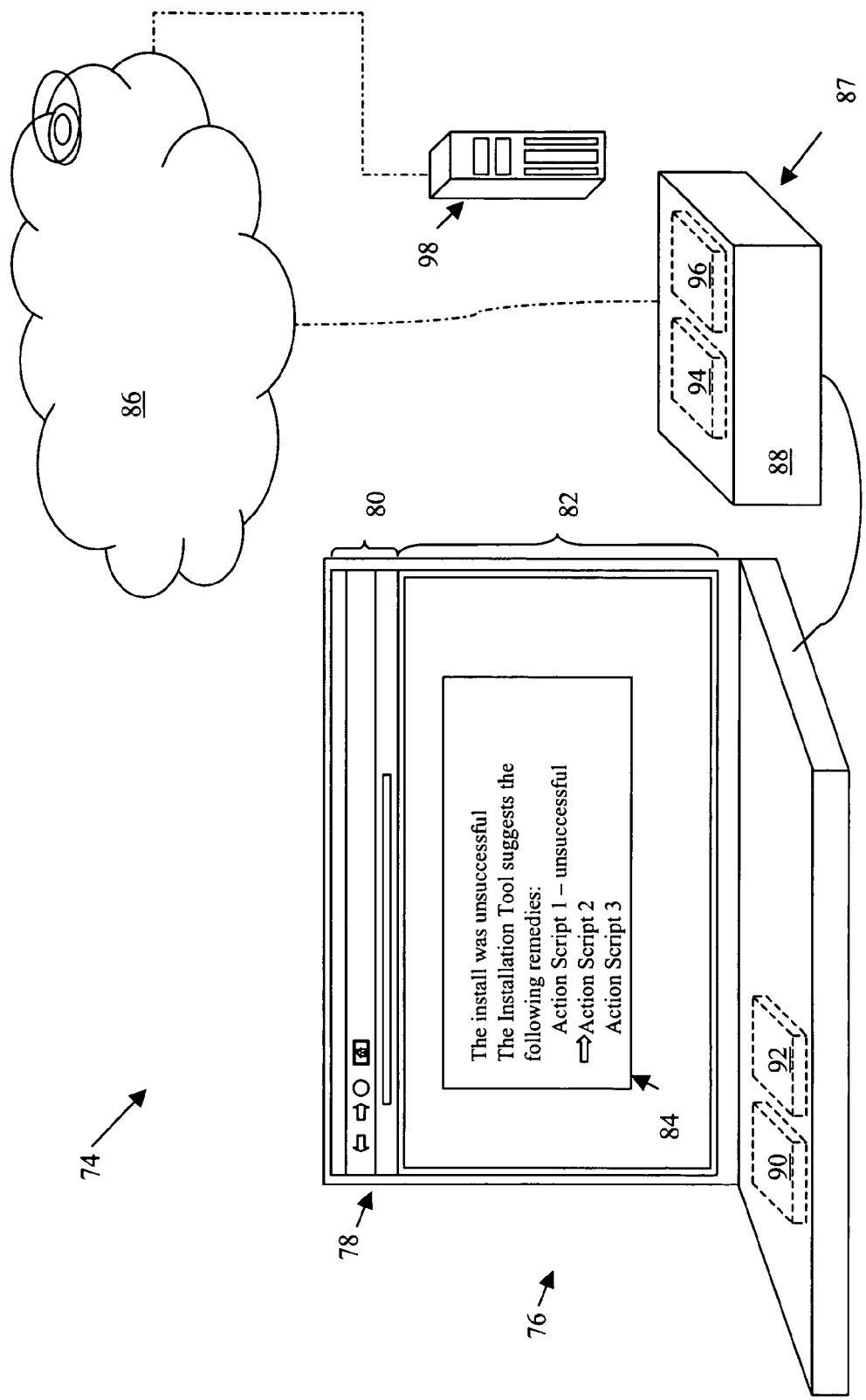
FIG. 3 shows one embodiment of a system that incorporates teachings of the present disclosure to assist a user during an installation process.

Whatever the user's goal in FIG. 3, an installation support tool may have recognized a failed attempt to complete installation and/or activation of a desired software and/or hardware peripheral. In practice, the user may have contacted a help desk of a network service provider, and a service technician may have directed the user to perform a step or function that initiated the display of GUI element 84. The user and the technician may now step through suggested action scripts in an effort to resolve the problem.

Depending upon implementation detail, a displayed page may, as shown, include or link to some level of self-diagnostic information and may be coded in HTML. The page may indicate a point at which an install routine failed and provide possible solutions for the failure. In some cases, the page may be designed to present a short-cut page for an installation process. The short-cut page may be designed so as to present a user with links to various steps of the install process in addition to or in lieu of actual diagnostic information and possible action script solutions.

For example, a DSL modem installation disk incorporating teachings of the present disclosure may include instructions for performing an integrated install and activation routine in a pre-defined and step-by-step manner. In practice, the end user may need to step through the entire routine in order to fully complete DSL installation and activation. If the routine fails at some point, the installation may not be completed, and the user may be unable to make use of a DSL service.

If the routine does fail, the user may call a Customer Help Desk number. In some cases, a Help Desk Agent may elect to manually walk the end user through the necessary steps to connect to and activate the DSL service. In other cases, the Agent may elect to utilize certain teachings of the present disclosure and ask the end user to launch a short cut page capable of shortening the processes for manually installing DSL. As shown in FIG. 3, the short-cut page may allow for the launching of diagnostic subroutines, which may initiate the display of GUI element 84.

As mentioned above, the short-cut page may be coded in HTML and may be run from the install disk. As such, the user may be able to see the page on display 78 without actually installing software onto computer 76. Depending upon implementation details, the short cut page may include links to each step of an integrated install and activation routine. The page may indicate successfully completed steps and diagnostic information. The page may display and/or include links to required minimum system requirements, current computer settings, and current system capabilities. In some cases, the page may indicate graphically if a requirement is or is not met by the current system.

The page may also include links that, when activated, initiate the installation of a web browser, such as Internet Explorer 6.0 and launch the web browser—directing it to a website, which may, for example facilitate service registration. The page may assist a user to select a username and password combination (UN/PW) and communicate the UN/PW to the DSL modem. The page may also simplify the selection of software and/or hardware to install. For example, the page may contain a link to other pages that include clear instructions and graphics for choosing software, for installing a modem, and/or for installing an appropriate POTS filter.

Figure 4:
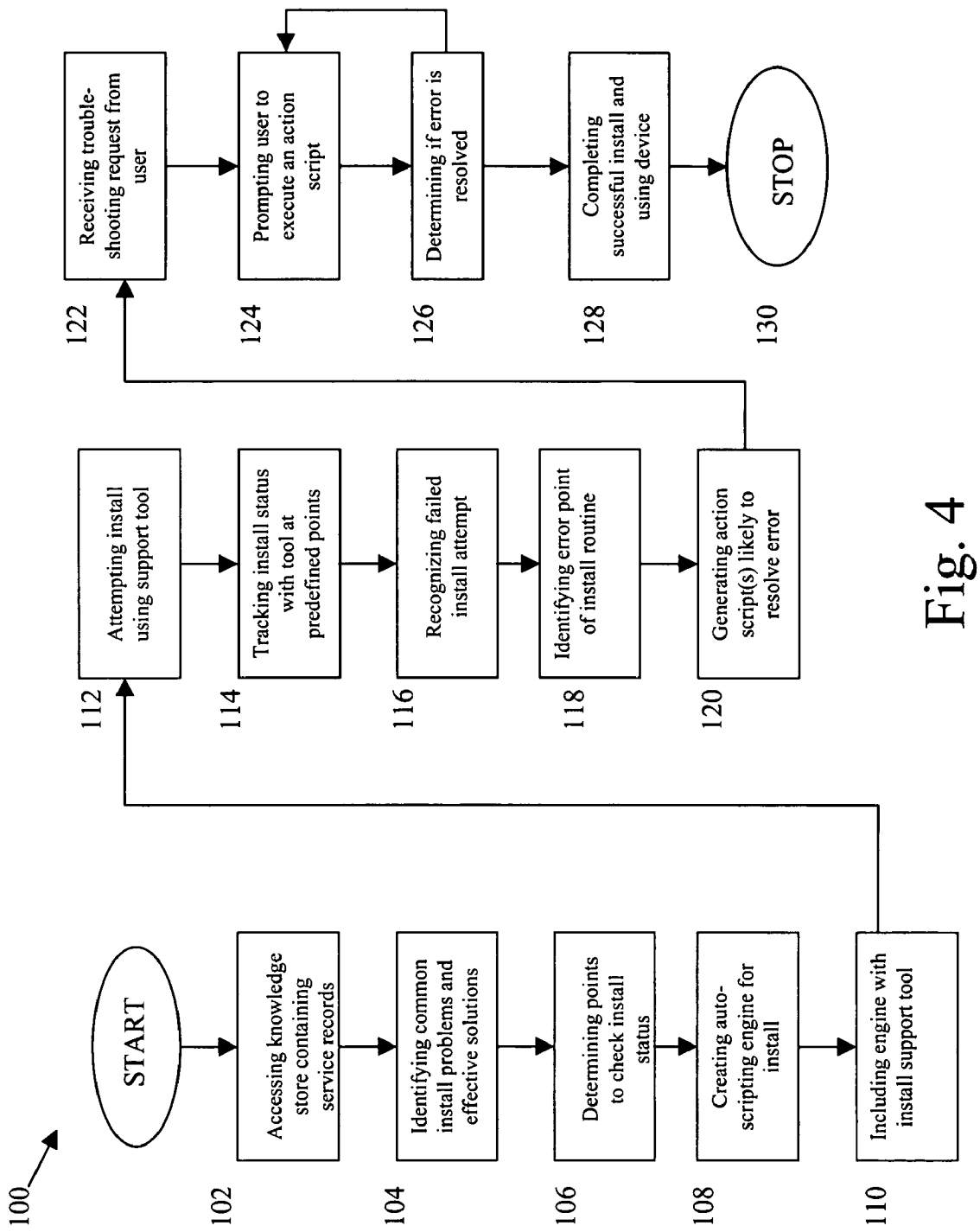
FIG. 4 presents a flow diagram for utilizing an installation support tool in accordance with the teachings of the present disclosure.

In practice, troubleshooting install problems with a distributed installation support tool may remove much of the guesswork normally associated with such an exercise—allowing a call center or field technician and/or a user to troubleshoot more effectively and circumvent frustrating computer-related issues. As mentioned above, FIG. 4 presents a flow diagram for a technique 100 that utilizes an installation support tool in accordance with the teachings of the present disclosure.

Technique 100 may begin at step 102 when a service provider accesses a knowledge store or other information repository maintaining service records. The service records may represent a collection of past install challenges experienced by users and the solutions that proved effective for the challenges. At step 104, the records may be reviewed and certain problem/solution combinations identified. In some embodiments, a problem/solution combination may include one or more problems and one or more possible solutions. The process of identifying the combinations may include the use of several criteria. For example, the frequency of the problem, real-time solvability of the problem, the length of time to resolve the problem, and/or the severity of the problem may all be selection criteria.

For a given problem identified at step 104, a developer may attempt to identify points in a typical install routine at which the problem may arise or becomes identifiable as a problem. For example, if a given device driver requires 256 MB of RAM to operate properly, a developer may tag a current system configuration step in an install routine to be an important point of the install routine. If the current system configuration indicates that the computer system to which the device driver is being added has 128 MB, the device driver may not operate properly. And, a service technician attempting to troubleshoot the device and/or the device driver's operation may appreciate being directed to the low RAM situation quickly.

However accomplished, the process of identifying points at which to check an install status may occur at step 106. At step 108, an auto-scripting engine may be coded. In practice, the auto-scripting engine may be launchable in response to an install error and capable of accessing a listing of problem/solution combinations as well as an accounting of information captured at various pre-defined install status checkpoints. When launched, the engine may consider the accounting in an effort to zero in on the problem and then generate a suggested action script to resolve the problem.

At step 110, an auto-scripting engine may be included with an installation support tool, and at step 112 a user may attempt an install using the support tool. At step 114, the support tool may assist in tracking the install status at predefined points. The predefined points may include, for example, the points identified in step 106. At step 116, a failed install attempt may be recognized and a potential error point may be identified at step 118.

The auto-scripting engine may generate one or more potential problem solving scripts at step 120. As mentioned above, the scripting engine may have access to an accounting of captured install status checks. Moreover, the scripting engine may be capable of considering this accounting and using it to identify a potential cause of the install failure. Similarly, the scripting engine may have access to information representing problem/solution combinations. The scripting engine may compare one or more identified potential causes against the problem/solution information to determine a potential solution and output one or more action scripts designed to effectuate the potential solution.

At step 122, a user may contact a service provider help desk requesting troubleshooting assistance. At step 124, a service technician may prompt the user to access a menu of potential action scripts generated by the scripting engine and to launch an action script. The menu may contain a simple list of selectable icons associated with action scripts. It may also include additional information about the install failure. For example, the menu may include a brief description of what is believed to be the problem. In some cases, the menu may include a list of potential problems with associated solution scripts. The menu may also include a likelihood factor indicating how certain the installation support tool is that the listed problem is the actual problem.

For example, if a user refused to accept a EULA and the install terminated in response, the menu may describe the potential problem as "User did not accept EULA" and may assign a 99% likelihood factor to the problem.

As mentioned above, a technician may prompt a user to launch a script at step 124. At step 126, the effectiveness of the script may be determined. If the script did not resolve the problem, technique 100 may loop back to step 124 where another script may be selected. If the script was effective, technique 100 may progress to step 128 and the install may be completed successfully. If another problem is encountered, technique 100 may loop back to a step like step 116. Technique 100 may eventually progress to stop at step 130.

It should be understood that the mechanisms, computers, devices, engines, servers, and/or platforms, described herein, may take several different forms and may be stand alone and/or incorporated into several different pieces of equipment, like laptop computers, desktop computers, telephones, mainframes, PSTN switches, Ethernet switches, routers, gateways, hardware, firmware, software, work stations, other options having some level of computing capability, and/or a combination thereof. For example, various engines could be independent applications, could be independent servers, could be executing on different platforms, and/or could be executing on a single platform.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art. The benefits, advantages, solutions to problems, and any element(s) that may cause any benefit, advantage, or solution to occur or become more pronounced are not to be construed as a critical, required, or essential feature or element of the present disclosure. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A method comprising:

executing a support tool that includes an install routine on a computer system located at a customer premises, the support tool to install a peripheral driver associated with a digital subscriber line modem to enable the digital subscriber line modem to access a service provider network;

capturing install states of the peripheral driver at a plurality of predefined points while installing the peripheral driver, wherein at least one predefined point of the plurality of predefined points records a configuration of the computer system, wherein the recorded configuration of the computer system includes at least available memory information, and wherein the plurality of predefined points is determined based on an analysis of a collection of customer service records;

detecting an error at one of the plurality of predefined points during the install routine;

launching an auto-scripting engine in response to detecting the error, the auto-scripting engine to access problem-solution combinations based on the install states;

generating a plurality of action scripts crafted to resolve the error based on the problem-solution combinations; and selecting a first action script from the plurality of action scripts based on the error.

2. The method of claim 1, further comprising executing the first action script.

3. The method of claim 2, further comprising:
resolving the error after executing the first action script; and
resuming installation of the peripheral driver from a point prior to the one of the plurality of predefined points.

4. The method of claim 2, further comprising:
resolving the error after executing the first action script; and
beginning a new install routine for the peripheral driver.

5. The method of claim 2, further comprising:
determining whether executing the first action script has resolved the error;
when executing the first action script has not resolved the error, selecting a second action script; and
executing the second action script.

6. The method of claim 1, further comprising prompting a user to accept a licensing agreement associated with the peripheral driver prior to executing the support tool.

7. The method of claim 1, further comprising:
prompting a user to accept a licensing agreement associated with the peripheral driver after executing the support tool; and
recording a user response to the licensing agreement at a first predefined point of the plurality of predefined points.

8. The method of claim 1,
wherein the collection of customer service records includes customer service records of past installation problems.

9. The method of claim 1, wherein the recorded configuration of the computer system further includes operating system information.

10. The method of claim 1, wherein the recorded configuration of the computer system further includes processor information.

11. The method of claim 1, wherein the recorded configuration of the computer system further includes communication port information.

12. An installation support system comprising:
a housing component at least partially defining an enclosure;
a processor within the enclosure;
an install engine comprising operational instructions that are executable by the processor to:
execute an install routine for a peripheral driver associated with a digital subscriber line modem to enable the digital subscriber line modem to access a service provider network;
capture install states at a plurality of predefined points in the install routine for the peripheral driver associated with the digital subscriber line modem, wherein a first predefined point of the plurality of predefined points comprises a recordation of a configuration of a computer system that is installing the peripheral driver, wherein the recordation of the configuration of the computer system includes at least an available memory of the computer system, and wherein the plurality of predefined points is determined based on an analysis of a collection of customer service records; and
detect an error at one of the plurality of predefined points during the install routine; and
a script generator that is launched by the install engine in response to the install engine detecting the error, the script generator operable to:
access problem-solution combinations based on the install states;
generate a plurality of action scripts crafted to resolve the error based on the problem-solution combinations; and
select a first action script from the plurality of action scripts based on the error.

13. The installation support system of claim 12, further comprising a non-transitory computer readable medium, wherein a set of instructions embodying the install engine and the script generator are stored at the non-transitory computer readable medium.

14. The installation support system of claim 12, wherein the install engine is further operable to execute the first action script to resolve the error.

15. The installation support system of claim 14, wherein, when the first action script does not resolve the error, the install engine is further operable to select a second action script from the plurality of action scripts and to execute the second action script to resolve the error.

16. A tangible computer-readable non-transitory storage medium having computer-readable instructions to cause a processor to:
execute an install routine for a peripheral driver associated with a digital subscriber line modem to enable the digital subscriber line modem to access a service provider network;
capture install states at a plurality of predefined points in the install routine for the peripheral driver associated with the digital subscriber line modem, wherein a first predefined point of the plurality of predefined points comprises a recordation of a configuration of a computer system that is installing the peripheral driver, wherein the recordation of the configuration of the computer system includes at least an available memory of the computer system, and wherein the plurality of predefined points is determined based on an analysis of a collection of customer service records;
detect an error at one of the plurality of predefined points during installation via the install routine;
launch an auto-scripting engine in response to detecting the error, the auto-scripting engine to access problem-solution combinations based on the install states;
generate a plurality of action scripts crafted to resolve the error based on the problem-solution combinations;
select a first action script from the plurality of action scripts based on the error;
execute the first action script to resolve the error; and
resume the installation upon resolving the error.

17. The tangible computer-readable non-transitory storage medium of claim 16, further comprising executable instructions to initiate display of a graphical user interface element presenting an accounting of captured install states.

18. The tangible computer-readable non-transitory storage medium of claim 16, further comprising executable instructions to initiate display of a graphical user interface element presenting a menu comprising the plurality of action scripts crafted to resolve the error.

19. The tangible computer-readable non-transitory storage medium of claim 16, further comprising executable instructions to determine whether executing the first action script has resolved the error and to select a second action script when executing the first action script has not resolved the error.

20. The tangible computer-readable non-transitory storage medium of claim 19, further comprising executable instructions to execute the second action script to resolve the error.

* * * * *